United States Patent
Amano (10) Patent No.: US 8,294,911 B2
(45) Date of Patent: Oct. 23, 2012

(54) PRINT CONTROL METHOD FOR A PRINTER AND A PRINTER CONFIGURED WITH A NORMAL PRINT MODE AND AN INVERTED PRINT MODE

(75) Inventor: Maki Amano, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 821 days.

(21) Appl. No.: 12/367,307

(22) Filed: Feb. 6, 2009

(65) Prior Publication Data

US 2009/0207427 A1     Aug. 20, 2009

(30) Foreign Application Priority Data

Feb. 14, 2008  (JP) ................................ 2008-032792

(51) Int. Cl.
*G06F 3/12* (2006.01)
(52) U.S. Cl. ..................... 358/1.13; 358/1.16; 358/1.17; 358/426.05; 358/523
(58) Field of Classification Search .......... 358/1.1–3.23; 715/200–277
See application file for complete search history.

(56) References Cited

U.S. PATENT DOCUMENTS 4,901,248 A * 2/1990 Ueno et al. .................... 715/210
2005/0280685 A1 * 12/2005 Yokoi ........................... 347/104
2006/0227356 A1 * 10/2006 Jeong et al. ................... 358/1.13
2006/0232819 A1    10/2006 Kasamatsu
2006/0232820 A1    10/2006 Kasamatsu

FOREIGN PATENT DOCUMENTS

| JP | 2003-085649 | 3/2003 |
| JP | 2005-349746 | 12/2005 |
| JP | 2006-303741 | 11/2006 |

* cited by examiner

*Primary Examiner* — Benny Q Tieu
*Assistant Examiner* — Marcellus Augustin (57) ABSTRACT

A printer prints all print data when an inverted print mode is selected for printing even if an insufficient memory state occurs in the image conversion buffer. If the roll paper printer 1 is set to the inverted print mode and an insufficient memory monitoring unit 23 detects an insufficient memory state in the image conversion buffer 13 before the inverted image data generating unit 22 converts and writes all of the received print data to a print data break to the image conversion buffer 13, the print mode switching unit 25 changes the print mode from the inverted print mode to the normal print mode, and the normal printing unit 26 prints the print data from the beginning. Because the print data is printed from the beginning when the inverted image data cannot be correctly generated because of insufficient memory, there is no loss of information contained in the print data.

12 Claims, 5 Drawing Sheets

PRINT CONTROL METHOD FOR A PRINTER AND A PRINTER CONFIGURED WITH A NORMAL PRINT MODE AND AN INVERTED PRINT MODE

CROSS-REFERENCE TO RELATED APPLICATIONS

Japanese Patent application No. 2008-032792 is hereby incorporated by reference in its entirety.

BACKGROUND

1. Field of Invention

The present invention relates to a printing control method for a printer and to a printer that receives print data from an external device and has a normal print mode in which a direct print image of the print data is printed, and an inverted print mode in which the print image of this print data is printed rotated 180 degrees.

2. Description of Related Art

When a cooking order is entered in from the dining room of a fast food restaurant or other type of store using the POS terminal or POS register of an order entry system, an order preparation ticket showing the order to be prepared is printed from a printer located in the kitchen. Roll paper printers are typically used in the kitchen, and the printer is often placed vertically instead of horizontally, or even hung on the wall, in order to save shelf space and leave more working space for cooking.

When the roll paper printer is placed horizontally, the order preparation ticket issued from the paper exit of the roll paper printer is output vertically from the bottom to the top so that the cook can easily verify what dishes to prepare by reading the order preparation ticket while working. When the roll paper printer is placed in the vertical orientation, however, the order preparation ticket issued from the paper exit of the roll paper printer is output vertically from top to bottom, resulting in the top and bottom of the printout being inverted and the ticket being difficult to read. As a result, instead of simply printing the print image of the received print data directly in the normal print mode, roll paper printers used in such order entry systems rotate the print image of the print data received from the order entry system 180 degrees for printing in the inverted print mode so that the printout is reversed and the order preparation ticket can be read easily. Japanese Unexamined Patent Appl. Pub. JP-A-2005-349746 teaches a printer that can switch between the normal print mode and inverted print mode according to the orientation in which the printer is placed.

In order to rotate the print image of the print data received from an external device 180 degrees, the data contained in the print data received in chronological order must be rearranged in reverse chronological order. The print image of each character and image must also be rotated 180 degrees. Printers having an inverted print mode as described above must therefore sequentially convert the received print data into an image conversion buffer until a break in the print data is detected to generate inverted image data for printing in the inverted print mode, and then print the inverted image data.

When an unexpectedly large amount of print data is received from the external device, the image conversion buffer may overflow before the printer can complete converting all of the print data up to a print data break. When the buffer capacity is exceeded, the data at the end of the print data cannot be moved to the beginning of the inverted image data in the print buffer, and the printer therefore cannot correctly generate the inverted image data. When this situation occurs with the related art, only the inverted image data written to the image conversion buffer before the buffer was filled is printed, and the print data received after the full buffer state was reached is simply dropped without being printed.

When data is printed in this way, however, the print data received by the printer and the printout printed by the printer may not match. For example, the order entry system may have sent print data containing all of the dishes that were ordered and need preparing and the printer may have correctly received the same print data, but all of the dishes may not be printed on the order preparation ticket printed by the kitchen printer. This obviously creates a problem delivering the products ordered by the customer, and casts doubt on the reliability of the order entry system.

SUMMARY OF INVENTION

A printing control method for a printer and a printer according to the present invention enable printing all received print data when printing in the inverted print mode even if the image conversion buffer used for rotating the print image 180 degrees and generating inverted image data overflows.

A first aspect of the invention is a printing control method for a printer that has a normal print mode for printing a print image of print data as received, and an inverted print mode for printing the print image of the print data rotated 180 degrees, the control method including a print mode setting step of setting the normal print mode or the inverted print mode; an inverted image data generating step of sequentially converting the received print data to a print data break into an image conversion buffer and generating inverted image data for printing in the inverted print mode when the inverted print mode is set; an insufficient memory monitoring step of monitoring whether an insufficient memory state occurs in the image conversion buffer; an inverted printing step of printing the inverted image data; a print mode switching step of changing from the inverted print mode to the normal print mode if an insufficient memory state is detected; and a normal printing step of printing the print data from the beginning.

If the inverted print mode is selected and an insufficient memory state occurs in the image conversion buffer before the print data to a print data break has been converted into the image conversion buffer, inverted image data for printing in the inverted print mode cannot be correctly generated. If printing proceeds based on this inverted image data, part of the information contained in the print data will be dropped and not printed using the method of the related art.

The invention, however, changes from the inverted print mode to the normal print mode and prints the print data from the beginning if an insufficient memory state in the image conversion buffer occurs when the inverted print mode is selected. If the inverted image data cannot be correctly generated, the received print data is printed from the beginning in the normal print mode normally used for printing, and part of the information contained in the print data will therefore not be dropped without being printed. A match between the print data received by the printer and the printout printed from the printer can therefore be assured. Furthermore, by assuring a match between the print data and the printout, it is not necessary for the external device that sends the print data to the printer having an inverted print mode to know the data capacity of the image conversion buffer when the print data is converted to the image conversion buffer. Writing an application program that runs on the external device is therefore simple.

In order to print the print data from the beginning using the inverted image data written to the image conversion buffer, the normal printing step in a printing control method according to another aspect of the invention includes a data conversion step of converting the inverted image data to normal print data for printing in the normal print mode, a first printing step of printing the normal print data, and a second printing step of printing print data received after the insufficient memory state was detected.

In order to set the printing mode of the printer easily, the print mode setting step in a printing control method according to another aspect of the invention sets the inverted print mode based on operation of a switch for setting the normal print mode or inverted print mode.

Alternatively, the print mode setting step receives a print mode setting command for setting the inverted print mode and sets the inverted print mode accordingly.

In a printing control method according to another aspect of the invention, the inverted image data generating step compresses the print data, subsamples the print data, or deletes spaces in the print data and writes sequentially to the image conversion buffer.

Compression, subsampling, and space deletion may also be combined. This makes it more difficult for an insufficient memory state to occur in the image conversion buffer, and reduces the frequency of switching from the inverted print mode to the normal print mode.

Another aspect of the invention is a printer that has a normal print mode for printing a print image of print data as received, and an inverted print mode for printing the print image of the print data rotated 180 degrees, the printer having a print mode setting unit for setting the normal print mode or the inverted print mode; an image conversion buffer; an inverted image data generating unit for sequentially converting the received print data to a print data break into an image conversion buffer and generating inverted image data for printing in the inverted print mode when the inverted print mode is set; an insufficient memory monitoring unit for monitoring whether an insufficient memory state occurs in the image conversion buffer; an inverted printing unit for printing the inverted image data when the inverted print mode is set; a print mode switching unit for changing from the inverted print mode to the normal print mode if an insufficient memory state is detected; and a normal printing unit for printing the print data from the beginning when the normal print mode is set.

If the inverted print mode is selected and the insufficient memory monitoring unit detects an insufficient memory state in the image conversion buffer to which the inverted image data is written, the print mode setting unit changes the inverted print mode to the normal print mode, and the normal printing unit prints the print data from the beginning. Because the received print data is printed from the beginning in the normal print mode used for normal printing when the inverted image data cannot be correctly generated, part of the information contained in the print data is not dropped without being printed. A match between the print data received by the printer and the printout printed from the printer can therefore be assured. Furthermore, by assuring a match between the print data and the printout, it is not necessary for the external device that sends the print data to the printer having an inverted print mode to know the data capacity of the image conversion buffer when the print data is converted to the image conversion buffer. Writing an application program that runs on the external device is therefore simple.

In order to print the print data from the beginning using the inverted image data written to the image conversion buffer, the normal printing unit includes a print data conversion unit for converting the inverted image data to normal print data for printing in the normal print mode, and a continuous printing unit for continuously printing the normal print data and then print data received after the insufficient memory state was detected in this order.

In order to set the printing mode of the printer easily, the print mode setting unit in a printer according to another aspect of the invention has a switch for setting the inverted print mode or the normal print mode.

Alternatively, the print mode setting unit sets the inverted print mode or the normal print mode based on a print mode setting command received from an external device.

In other aspects of the invention, the inverted image data generating unit compresses the print data, subsamples the print data, or deletes spaces in the print data and writes sequentially to the image conversion buffer.

Compression, subsampling, and space deletion may also be combined. This makes it more difficult for an insufficient memory state to occur in the image conversion buffer, and reduces the frequency of switching from the inverted print mode to the normal print mode.

If an insufficient memory state in the image conversion buffer occurs when the inverted print mode is selected, the invention changes from the inverted print mode to the normal print mode and prints the print data from the beginning. If the inverted image data cannot be correctly generated, the received print data is printed from the beginning in the normal print mode normally used for printing, and part of the information contained in the print data will therefore not be dropped without being printed. A match between the print data received by the printer and the printout printed from the printer can therefore be assured. Furthermore, by assuring a match between the print data and the printout, it is not necessary for the external device that sends the print data to the printer having an inverted print mode to know the data capacity of the image conversion buffer when the print data is converted to the image conversion buffer. Writing an application program that runs on the external device is therefore simple.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of a roll paper printer according to the present invention is described below with reference to the accompanying figures.

General Configuration

Figure 1A:
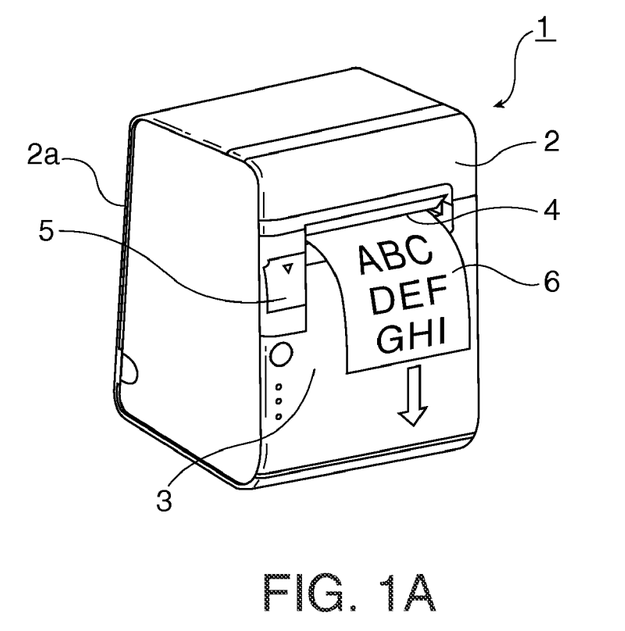
FIG. 1 is an oblique external view of a roll paper printer according to the present invention.
Figure 1B:
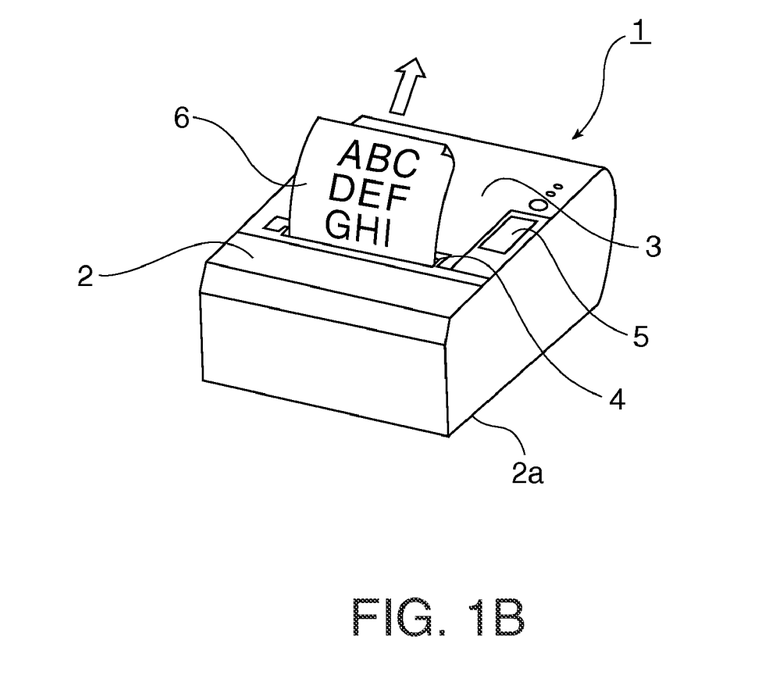

FIG. 1 is an oblique external view of a roll paper printer according to the present invention, FIG. 1A showing the roll paper printer in the vertical orientation and FIG. 1B showing the roll paper printer in the horizontal orientation. The 1 is a line thermal printer having two print modes, a normal print mode in which a print image of the print data received from an external device is printed in the same way in which it is received, and an inverted print mode in which the print image of the received print data is rotated 180 degrees for printing.

As shown in FIG. 1A, the roll paper printer 1 has a rectangular box-like case 2 and a cover 3 that opens and closes and is disposed to the front of the case 2. A paper exit 4 of a specific width is formed at the top front of the outside case part of the printer case 2. A cover opening lever 5 is disposed beside the paper exit 4. Operating the cover opening lever 5 unlocks the cover 3 so that the cover 3 can open forward to a substantially horizontal position pivoting at the bottom end part thereof below the paper exit 4. When the cover 3 opens, the roll paper compartment not shown formed inside the case 2 is open, and roll paper can be easily loaded or replaced from the front of the printer. When the roll paper is loaded in the roll paper compartment, the leading end of the web of printing paper 6 is pulled off the roll, and the cover 3 is closed, the printing paper 6 is correctly positioned in the transportation path passed the line thermal head (see FIG. 2) and ready for printing.

When the roll paper printer 1 is placed vertically as shown in FIG. 1A, the printed tickets are discharged hanging top to bottom from the paper exit 4. As a result, if the received print data is printed in the normal top-to-bottom print mode, which is the normal print mode, the ticket will be printed with the top and bottom upside down. However, because the printed content cannot be easily read with the top and bottom of the ticket upside down, the user sets the print mode of the roll paper printer 1 to the inverted print mode so that the print data image is printed rotated 180 degrees.

The roll paper printer 1 may also be used horizontally as shown in FIG. 1B with the back panel 2a of the case 2 on the bottom against the countertop. When the roll paper printer 1 is placed horizontally, the printed tickets are discharged from the paper exit 4 hanging from the bottom up, and the top and bottom of the printed ticket are not upside down. The user may therefore leave the print mode of the roll paper printer 1 set to the normal print mode, and the print image of the received print data can be printed in the same way it is received.

A DIP switch 14 (see FIG. 2) is disposed to the case 2. The user can set this DIP switch 14 as desired to preset the print mode of the roll paper printer 1 to the normal print mode or the inverted print mode.

Control System

Figure 2:
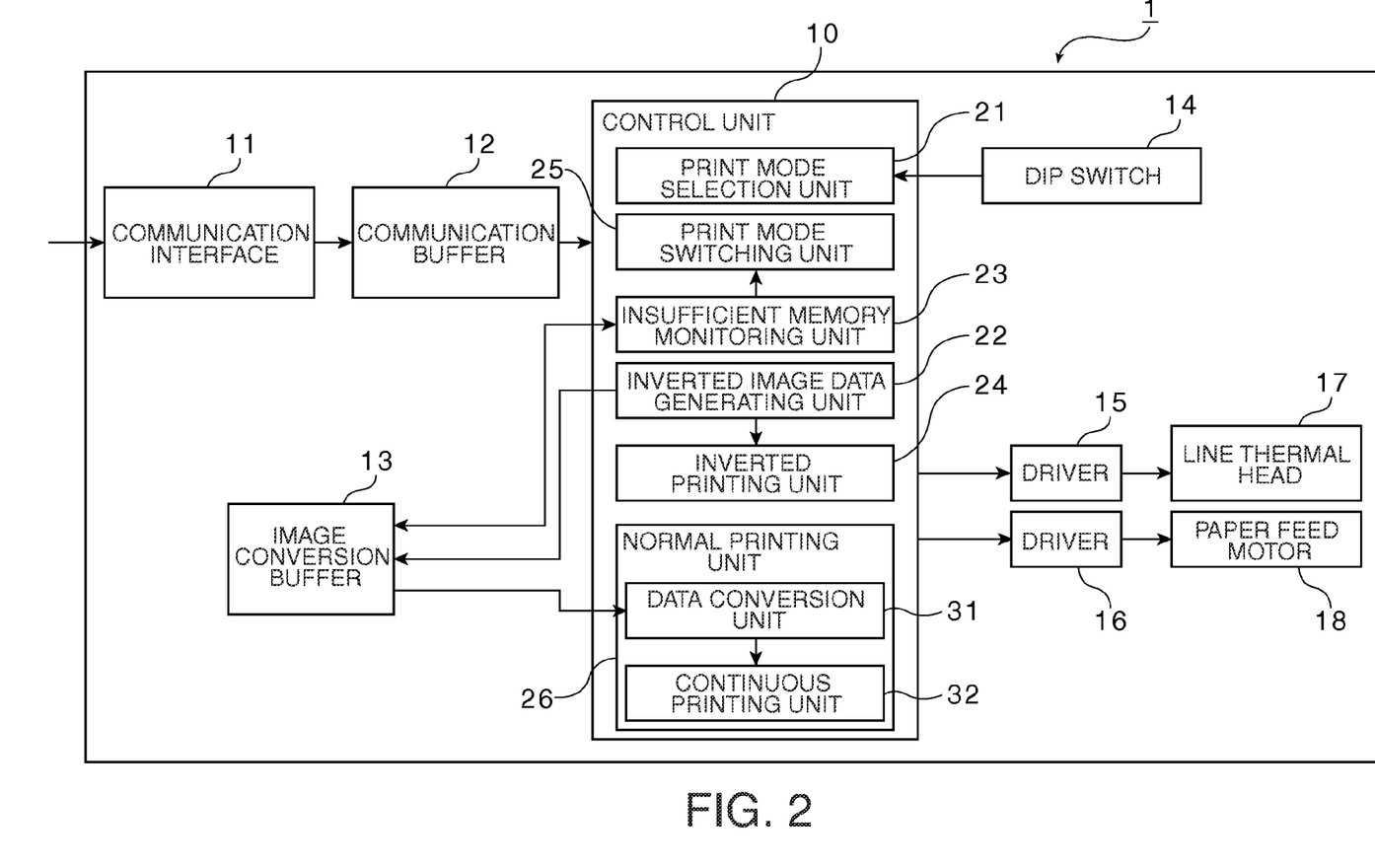
FIG. 2 is a block diagram of a roll paper printer according to the present invention.

FIG. 2 is a block diagram of the control system of a roll paper printer according to the present invention. The control system of this roll paper printer 1 is built around a control unit 10 including a CPU, RAM, and ROM. Print data is supplied from an external device through a communication interface 11 and communication buffer 12 to the control unit 10.

An image conversion buffer 13 and the DIP switch 14 are connected to the control unit 10. A line thermal head 17 and paper feed motor 18 are connected to the output side of the control unit 10 through a print head driver 15 and motor driver 16. The control unit 10 includes a print mode selection unit 21, an inverted image data generating unit 22, an insufficient memory monitoring unit 23, an inverted printing unit 24, a print mode switching unit 25, and a normal printing unit 26.

The print mode selection unit 21 sets the print mode of the roll paper printer 1 to the normal print mode or inverted print mode based on how the user set the DIP switch 14. If the print mode selection unit 21 sets the print mode to the inverted print mode, the inverted print mode is reset before new print data is received at the end of one print job printing the print data to one break point if the print mode has been changed to the normal print mode.

When the inverted print mode is set, the inverted image data generating unit 22 converts the received print data to the print break into the image conversion buffer 13 as the data is received and generates inverted image data. More specifically, the inverted image data generating unit 22 reverses the chronological sequence of the data contained in the print data received in chronological order, rotates the print images of the received characters and images, and writes the inverted image data to the image conversion buffer 13.

More particularly, the print data supplied to the control unit 10 through the communication interface 11 and communication buffer 12 contains text data and image data, including attributes such as the printing position and size, as well as control commands such as paper discharge commands controlling discharging the printing paper 6. The inverted image data generating unit 22 interprets these control commands, generates print image data line by line according to the print format of the line thermal head 17, rotates the image of the print image data for each line 180 degrees, and writes the line images to the image conversion buffer 13 in the opposite chronological order in which the data was received to produce the inverted image data.

The inverted printing unit 24 controls driving the line thermal head 17 and paper feed motor 18 to print the inverted image data generated by the inverted image data generating unit 22.

The insufficient memory monitoring unit 23 monitors whether an insufficient memory state occurs in the image conversion buffer 13 while generating the inverted image data. If the insufficient memory monitoring unit 23 detects an insufficient memory state (buffer overflow) in the image conversion buffer 13, the print mode switching unit 25 changes the inverted print mode to the normal print mode.

If the print mode is set to the normal print mode, the normal printing unit 26 prints the print data supplied from the control unit 10 through the communication interface 11 and communication buffer 12 from the beginning as it is received. For example, the normal printing unit 26 interprets the text data, image data, and control commands contained in the print data temporarily stored in the communication buffer 12, and sequentially generates print data for each line according to the print format of the line thermal head 17. The normal printing unit 26 also controls driving the line thermal head 17 and paper feed motor 18 to print the print data line by line as it is generated.

The normal printing unit 26 includes a data conversion unit 31 and a continuous printing unit 32.

If the print mode switching unit 25 changes the inverted print mode to the normal print mode, the data conversion unit 31 converts the inverted image data to normal top-to-bottom print data for printing in the normal print mode. When normal top-to-bottom print data is generated and the normal print data is printed, the continuous printing unit 32 continues printing the print data that was stored in the communication buffer 12 after the insufficient memory state was detected. The data conversion unit 31 produces the normal print data from the inverted image data by, for example, reversing the process whereby the inverted image data generating unit 22 generated the inverted image data from the received print data.

Printing Operation of the Roll Paper Printer

Figure 3:
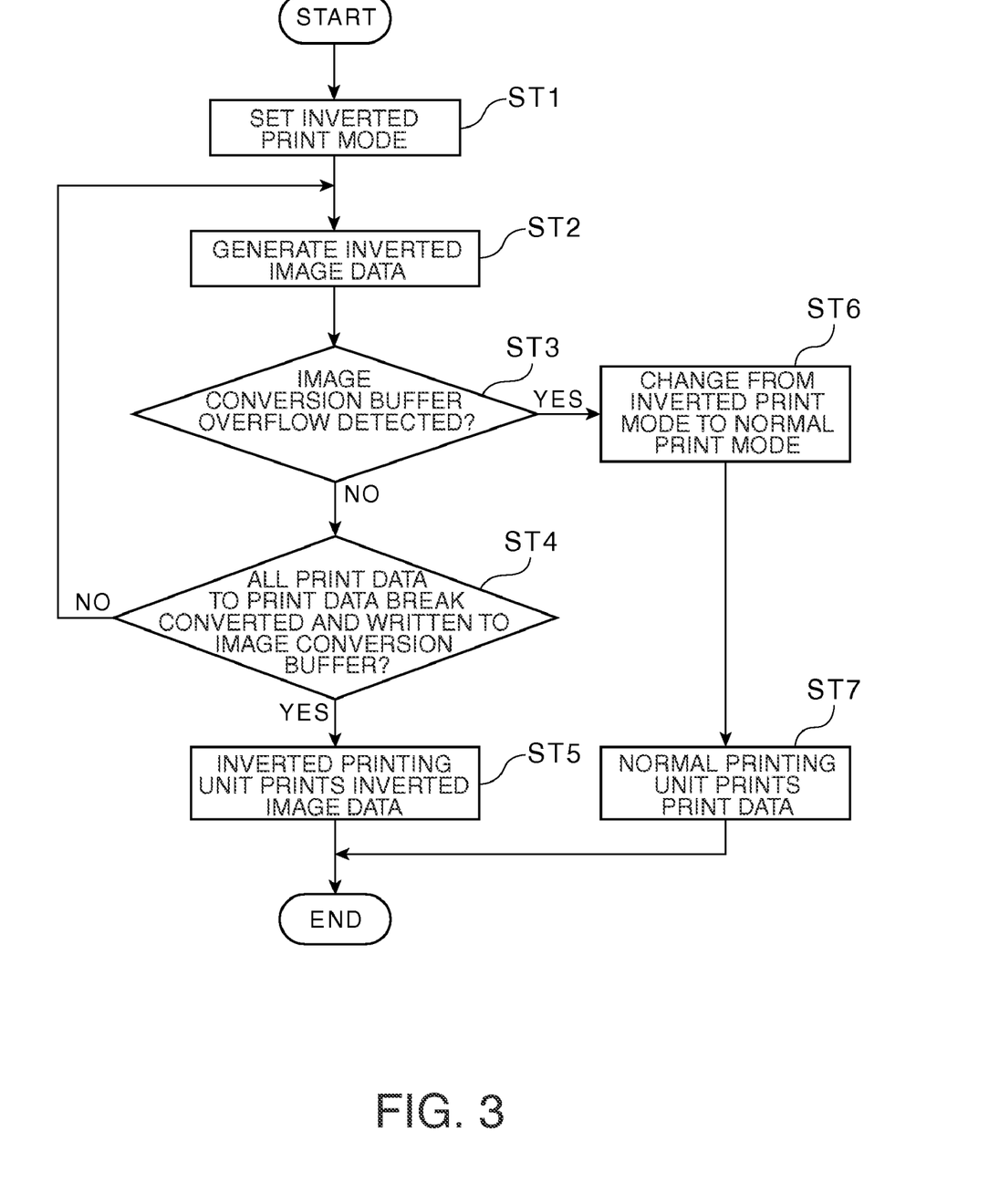
FIG. 3 is a flow chart describing the operation of a roll paper printer according to the present invention.
Figure 4A:
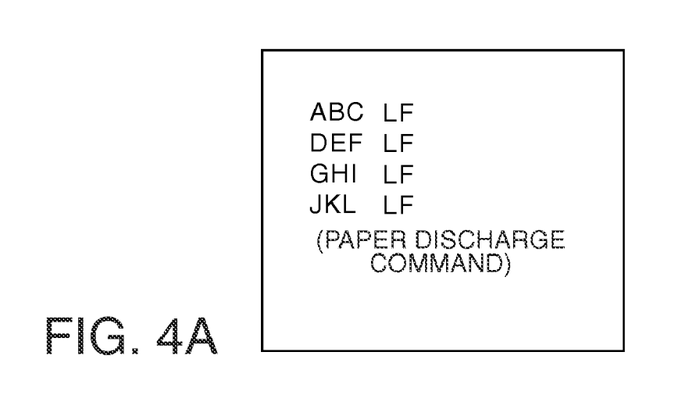
FIG. 4 describes the printout produced by a roll paper printer according to the present invention.
Figure 4B:
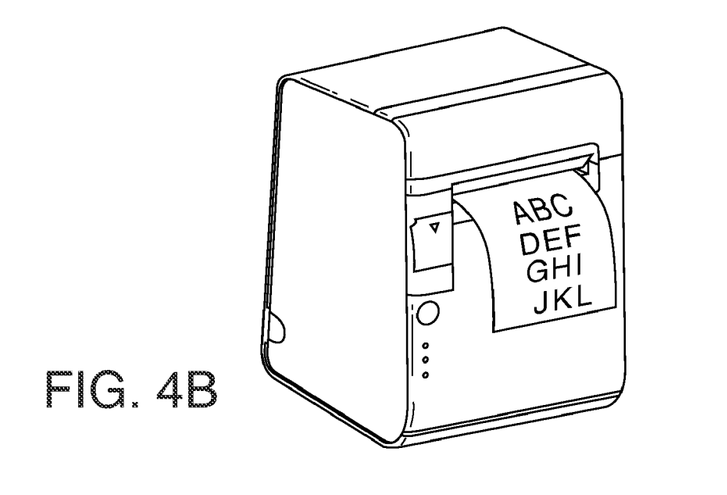
Figure 4C:
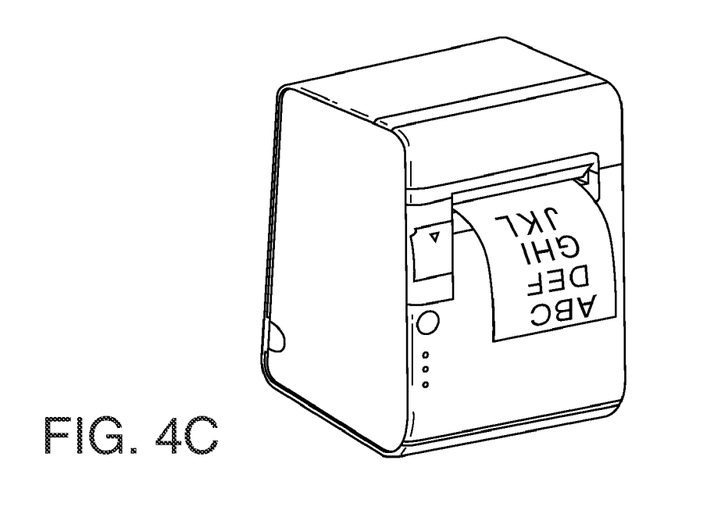

The printing operation of the roll paper printer 1 is described next with reference to FIG. 3 and FIG. 4. FIG. 3 is a flow chart describing the printing operation of the roll paper printer 1, and FIG. 4 describes the printout from this roll paper printer 1. FIG. 4A schematically describes the print data received from the external device, FIG. 4B shows the printout from the inverted print mode when an insufficient memory state does not occur in the image conversion buffer 13, and FIG. 4C shows the printout from the inverted print mode when an insufficient memory state occurs in the image conversion buffer 13.

The roll paper printer 1 is placed in the vertical position. As shown in FIG. 3, the print mode is set to the inverted print mode (step ST1).

As shown in FIG. 4A, the print data received from the external device includes the text "ABC", a line feed command LF, "DEF," line feed command LF, "GHI", line feed command LF, "JKL", line feed command LF, and a paper discharge command. The line feed command LF is a control command for advancing the paper, and the paper discharge command is used here as a break point in the print data. This print data results in sequentially printing ABC, DEF, GHI, JKL on different lines.

When the print data is received in the inverted print mode, the inverted image data generating unit 22 starts converting the print data as it is received into the image conversion buffer 13 and generating inverted image data for printing in the inverted print mode (step ST2).

More specifically, the inverted image data generating unit 22 generates the inverted image data written to the image conversion buffer 13 by reversing the print data received in the chronological order ABC, DEF, GHI, JKL to the reverse chronological order JKL, GHI, DEF, ABC while also rotating the image of each character 180 degrees.

While this process continues, the insufficient memory monitoring unit 23 monitors if an insufficient memory state occurs in the image conversion buffer 13 before the print data is converted and written to the image conversion buffer 13 to a break in the print data (steps ST3, ST4).

If the print data is converted into the image conversion buffer 13 to the print data break without the image conversion buffer 13 overflowing (step ST4), the resulting inverted image data is printed by the inverted printing unit 24 (step ST5). The result printed in this situation has the print image of the print data rotated 180 degrees as shown in FIG. 4B.

However, if an insufficient memory state occurs before the print data is converted to a break and written in the image conversion buffer 13 (step ST3 returns Yes), the print mode switching unit 25 changes the print mode from the inverted print mode to the normal print mode (step ST6). The normal printing unit 26 then prints the print data from the beginning in the order in which the print data is received (step ST7).

For example, if the capacity of the image conversion buffer 13 is small and an insufficient memory state occurs in the image conversion buffer 13 after writing the print data through the line GHI and the line feed command LF to the image conversion buffer 13, the inverted image data generating unit 22 cannot write the last line JKL and line feed command LF to the image conversion buffer 13. More particularly, an image of the last line of print data, JKL, cannot be written rotated 180 degrees to the beginning of the inverted image data, and the inverted image data generating unit 22 therefore cannot correctly produce the inverted image data.

The print mode is therefore changed in step ST6 to the normal print mode and the print data is printed from the beginning in step ST7. More specifically, the data conversion unit 31 of the normal printing unit 26 uses the inverted image data for the lines ABC, DEF, GHI stored in the image conversion buffer 13 to generate normally oriented print data for printing ABC, DEF, GHI separated by line feeds in this order in the normal print mode. The continuous printing unit 32 then prints this normally oriented print data and then continues printing the print data stored in the communication buffer 12 after the insufficient memory state was detected, that is, JKL and the line feed command LF in this example.

As a result, as shown in FIG. 4C, a print image of the received print data is printed as received, and the print data received by the roll paper printer 1 is assured of matching the printout from the roll paper printer 1.

If the user sets the DIP switch 14 so that the print mode of the roll paper printer 1 is set to the normal print mode, the received print data is printed from the beginning by the normal printing unit 26 as the data is received. This results in the printout shown in FIG. 4C.

In the example described above the print data received from the external device is written to the image conversion buffer 13 as the data is received, but the print data can be volumetrically reduced as it is converted. This reduces the chance of the image conversion buffer 13 overflowing and reduces the frequency of the inverted print mode being switched to the normal print mode. The amount of print data to be buffered can be reduced in various ways, including data compression, subsampling, and elimination of spaces.

Data compression refers to compressing the data input to the image conversion buffer 13. The inverted image data generating unit 22 compresses the received print data while writing sequentially to the image conversion buffer 13, and then decompresses while reproducing the inverted image data. This prevents the printout from being reduced.

Subsampling removes parts of image data, such as a logo, contained in the received print data. More specifically, every even (2, 4, 6, . . . ) data value in the received print data is removed when writing to the image conversion buffer 13. When the inverted image data is then reproduced, the even data values that were not removed are used to compensate for the even data values. This results in printing inverted image data (1, 1, 3, 3, 5, 5, . . . ) that is substantially the same as the received print data.

Elimination of spaces may, for example, reduce the line spacing. For example, if the print data contains a plurality of consecutive line feed commands LF, some of the line feed commands LF may be deleted when the data is written to the image conversion buffer 13 as shown below.

Received print data:

| | |
|---|---|
| text string A | LF |
| LF | |
| LF | |
| text string B | LF |

Data written to image conversion buffer 13 and the printout:

| | |
|---|---|
| text string A | LF |
| text string B | LF |

White spaces (SP) may also be deleted as shown below.
Received print data:

| | |
|---|---|
| text string A | LF |
| SP SP SP LF | |
| LF | |
| text string B | LF |

Data written to image conversion buffer 13 and the printout:

| | | |
|---|---|---|
| | text string A | LF |
| | LF | |
| | text string B | LF |

Whether a method such as data compression, subsampling, or deleting spaces is used, and what method is used, may be selected by appropriately setting the DIP switch 14, for example. A plurality of methods such as described above may also be used together.

Figure 5A:
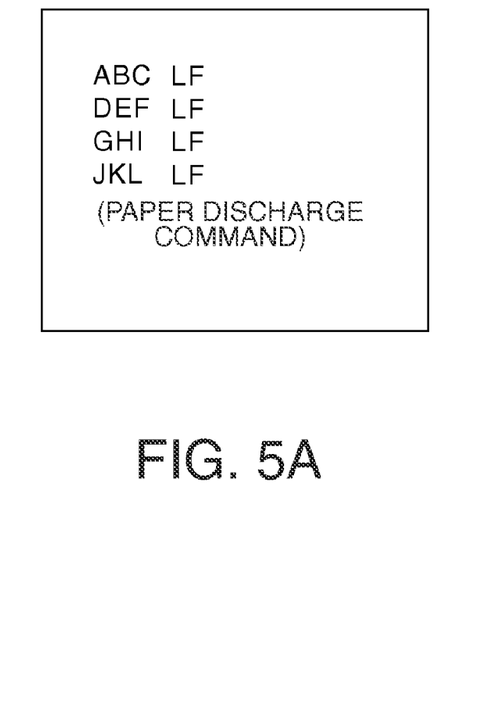
FIG. 5 describes the printout produced by a roll paper printer according to the related art.

For comparison, the printout resulting from the inverted print mode in a roll paper printer according to the related art is described next. FIG. 5A schematically describes the print data received from the external device, and FIG. 5B shows the printout from the roll paper printer according to the related art when an insufficient memory state occurs in the image conversion buffer.

Figure 5B:
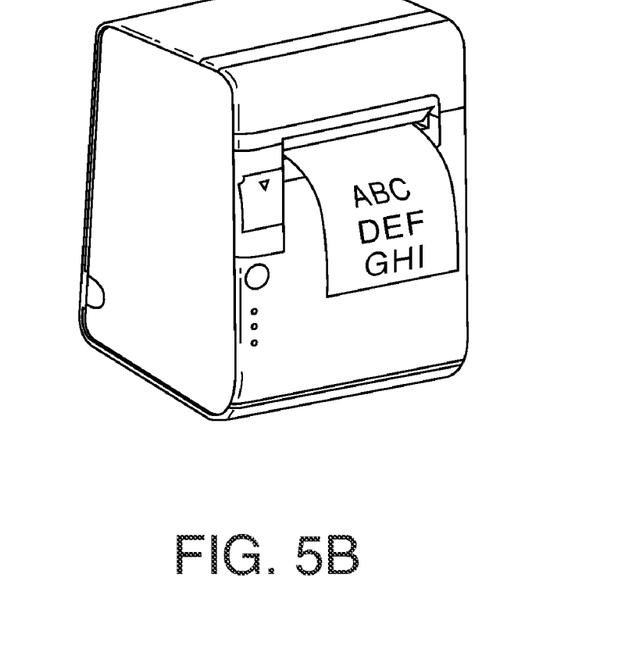

More specifically, FIG. 5B shows the printout that results when the print data received from the external device includes the text "ABC", LF, "DEF," LF, "GHI", LF, "JKL", LF, and a paper discharge command as described above, and a buffer overflow occurs in the image conversion buffer after writing the data through the line GHI and line feed command LF to the image conversion buffer.

When the insufficient memory state is detected, the roll paper printer according to the related art prints the inverted image data stored to the image conversion buffer 13. Because the last line containing JKL and the line feed command LF at the end of the print data has not been written to the image conversion buffer 13, JKL is not contained in the inverted image data. The string JKL is therefore dropped from the printout of the roll paper printer of the related art as shown in FIG. 5B.

Effect of the Invention

If the image conversion buffer 13 runs out of capacity when the inverted print mode is selected, the inverted print mode is changed to the normal print mode and the print data is printed from the beginning. Because the received print data can be printed from the beginning in the normal print mode used for normal printing when the inverted image data cannot be correctly generated, no part of the information contained in the print data will be dropped and not printed. The print data received by the roll paper printer 1 and the printout discharged from the roll paper printer 1 will therefore always match. Furthermore, because the print data and the printout are assured of matching, there is no need for the external device that sends the print data to the roll paper printer 1 having the inverted print mode to be aware of the state of buffer capacity when the print data is converted and written to the image conversion buffer 13. Writing the application program run by the external device is therefore easier.

In this embodiment of the invention the normal printing unit 26 has a data conversion unit 31 for converting the inverted image data to normal print data for printing in the normal print mode, and a continuous printing unit 32 for continuously printing the normal print data followed by the print data that is stored in the communication buffer 12 after an insufficient memory state state occurs in the image conversion buffer 13. The inverted image data stored in the image conversion buffer 13 can therefore be used to print the print data from the beginning.

Other Embodiments of the Invention

The print mode selection unit 21 sets the print mode based on the DIP switch 14 setting in the embodiment described above, but it is also conceivable to set the normal print mode or the inverted print mode based on a print mode configuration command if a print mode configuration command for setting the inverted print mode is received from the external device.

In addition, the normal printing unit 26 has a data conversion unit 31 and a continuous printing unit 32 in the embodiment described above, but the normal printing unit 26 may be rendered without these units. In this configuration the inverted image data generating unit 22 does not delete the received print data from the communication buffer 12 until the print data has been converted and written to the image conversion buffer 13 up to a break in the print data. This configuration enables the normal printing unit 26 to print the print data from the beginning by using the print data saved in the communication buffer 12 if the print mode is changed from the inverted print mode to the normal print mode.

The normal printing unit 26 sequentially generates print data line by line from the received print data according to the printing format of the line thermal head 17, and sequentially prints the resulting print data line by line. When the normal print mode is set, however, the print data can also be written to the image conversion buffer 13 to generate normally oriented image data for normal printing, and this normal print image data can then be printed.

Furthermore, generating the inverted image data by means of the inverted image data generating unit 22 and converting the inverted image data to normal image data by means of the data conversion unit 31 can be done using technology known from the literature, and are obviously not limited to the methods described above. The printers to which the present invention can be applied are therefore not limited to printers having a line thermal head.

The invention is described applied to a roll paper printer in the foregoing embodiment, but the printers to which the invention can be applied are not limited to roll paper printers and can be any printer that generates inverted image data for printing in an inverted print mode by sequentially converting print data up to a break in the print data into an image conversion buffer when set to the inverted print mode.

The invention being thus described, it will be apparent in view of such description that the invention may be varied in many ways. Such variations are not to be regarded as a departure from the spirit and scope of the invention. Rather, each such modification is intended to be included within the scope of the invention to the extent it falls within the scope of any of the following claims.

What is claimed is:

1. A printing control method for a printer that has a normal print mode for printing a print image of print data as received, and an inverted print mode for printing the print image of the print data rotated 180 degrees, the control method comprising: setting the normal print mode or the inverted print mode; sequentially converting the received print data to a print data break into an image conversion buffer and generating inverted image data for printing in the inverted print mode when the inverted print mode is set; monitoring whether an insufficient memory state occurs in the image conversion buffer; printing the inverted image data; changing from the inverted print mode to the normal print mode, the changing being executed by a print mode switching unit in response to an insufficient memory state being detected; printing the print data from the beginning; wherein: the printing step includes converting the inverted image data to normal print data for printing in the normal print mode, printing the normal print data, and printing print data received after the insufficient memory state was detected.

2. The printing control method for a printer described in claim 1, wherein: the setting step sets the inverted print mode based on operation of a switch for setting the normal print mode or inverted print mode.

3. The printing control method for a printer described in claim 1, wherein: the setting step receives a print mode setting command for setting the inverted print mode and sets the inverted print mode accordingly.

4. The printing control method for a printer described in claim 1, wherein: the sequentially converting step compresses the print data and writes sequentially to the image conversion buffer.

5. The printing control method for a printer described in claim 1, wherein: the sequentially converting step subsamples the print data and writes sequentially to the image conversion buffer.

6. The printing control method for a printer described in claim 1, wherein: the sequentially converting step deletes spaces in the print data and writes sequentially to the image conversion buffer.

7. A printer that has a normal print mode for printing a print image of print data as received, and an inverted print mode for printing the print image of the print data rotated 180 degrees, the printer comprising:

a print mode setting unit for setting the normal print mode or the inverted print mode; an image conversion buffer; an inverted image data generating unit for sequentially converting the received print data to a print data break into an image conversion buffer and generating inverted image data for printing in the inverted print mode when the inverted print mode is set; an insufficient memory monitoring unit for monitoring whether an insufficient memory state occurs in the image conversion buffer; an inverted printing unit for printing the inverted image data when the inverted print mode is set; a print mode switching unit that changes from the inverted print mode to the normal print mode in response to an insufficient memory state being detected; a normal printing unit for printing the print data from the beginning when the normal print mode is set;

wherein: the normal printing unit includes a print data conversion unit for converting the inverted image data to normal print data for printing in the normal print mode, and a continuous printing unit for continuously printing the normal print data and then print data received after the insufficient memory state was detected in this order.

8. The printer described in claim 7, wherein: the print mode setting unit has a switch for setting the inverted print mode or the normal print mode.

9. The printer described in claim 7, wherein: the print mode setting unit sets the inverted print mode or the normal print mode based on a print mode setting command received from an external device.

10. The printer described in claim 7, wherein: the inverted image data generating unit compresses the print data and writes sequentially to the image conversion buffer.

11. The printer described in claim 7, wherein: the inverted image data generating unit subsamples the print data and writes sequentially to the image conversion buffer.

12. The printer described in claim 7, wherein: the inverted image data generating unit deletes spaces in the print data and writes sequentially to the image conversion buffer.

* * * * *